(12) United States Patent
Li

(10) Patent No.: US 7,609,149 B2
(45) Date of Patent: Oct. 27, 2009

(54) REVERSE RADAR WITH VEHICLE APPROACHING ALARM

(76) Inventor: Zhitao Li, No. 28 Wanyuan Street, Dongfeng Town, Zhongshan City, Guangdong Province (CN)

( * ) Notice: Subject to any disclaimer, the term of this patent is extended or adjusted under 35 U.S.C. 154(b) by 425 days.

(21) Appl. No.: 11/532,136

(22) Filed: Sep. 15, 2006

(65) Prior Publication Data

US 2007/0080584 A1 Apr. 12, 2007

(30) Foreign Application Priority Data

Oct. 11, 2005 (CN) .................... 2005 2 0065507 U

(51) Int. Cl.
*B60Q 1/00* (2006.01)
*B60Q 1/48* (2006.01)
*G08G 1/14* (2006.01)
*G01S 13/00* (2006.01)

(52) U.S. Cl. .................. 340/435; 340/932.2; 342/70; 342/71; 342/72

(58) Field of Classification Search .................. 340/435, 340/932.2; 342/70, 71, 72; 701/36, 45–49
See application file for complete search history.

(56) References Cited

U.S. PATENT DOCUMENTS 6,281,786 B1 * 8/2001 Adachi et al. ............... 340/435
6,542,085 B1 * 4/2003 Yang .......................... 340/903
6,720,868 B2 * 4/2004 Flick .......................... 340/435
6,897,768 B2 * 5/2005 Sato et al. ................... 340/435
2002/0118103 A1 * 8/2002 Tabe .......................... 340/436
2004/0030489 A1 * 2/2004 Huang et al. ................ 701/117

* cited by examiner

*Primary Examiner*—Daniel Wu
*Assistant Examiner*—Mark Rushing

(57) ABSTRACT

The present invention relates to a reverse radar with vehicle approaching alarm comprising a main body and sensors, in which the main body comprises a CPU circuit, an operational amplifier circuit, a switching circuit, a signal transmitting-receiving circuit, a detecting circuit and a power source, and the input terminals of the CPU circuit are connected to the output terminals of the operational amplifier circuit, the detecting circuit and the power source, and the output terminal of the CPU circuit is connected to the input terminal of the switching circuit, and the input terminal of the operational amplifier circuit is connected to the output terminal of the switching circuit, and the switching circuit and the signal transmitting-receiving circuit are interconnected, and the output terminals of the power source are connected to the input terminals of the switching circuit and the signal transmitting-receiving circuit, and the main body further comprises an alarming source which gives a warning signal when another vehicle approaches and a controlling circuit which controls the alarming source, and the controlling circuit is connected to the output terminal of the CPU circuit and the power source. The structure of the present invention is simple. When the vehicle is parked in a car park and the driver is not present, the present invention can give a warning signal to alert the approaching vehicle so as to prevent accident.

10 Claims, 3 Drawing Sheets

REVERSE RADAR WITH VEHICLE APPROACHING ALARM

BACKGROUND OF THE INVENTION

The present invention relates to a radar in the technical field of signaling for vehicles and more particularly pertains to a reverse radar with vehicle approaching alarm.

For vehicles' safety and protection, there are different methods and products to protect the vehicles themselves. For example, a reverse radar gives a warning signal when the vehicle reverses so as to effectively prevent the vehicle from bumping against any obstacles. However, existing reverse radars only function when the vehicles are reversing. If the vehicle does not move, no warning signals will be given when another vehicle approaches. Therefore, when the vehicle is parked and the driver is not present, the accident of the vehicle being bumped by another approaching vehicle will easily happen.

BRIEF SUMMARY OF THE INVENTION

In view of the aforesaid disadvantages now present in the prior art, the present invention provides a reverse radar with vehicle approaching alarm. It can effectively prevent the accident of the vehicle being bumped by another approaching vehicle when the vehicle is parked and the driver is not present.

To attain this, the present invention generally comprises a main body and sensors. The main body comprises a CPU circuit, an operational amplifier circuit, a switching circuit, a sensor interface circuit, a detecting circuit and a power source. The input terminals of the CPU circuit are connected to the output terminals of the operational amplifier circuit, the detecting circuit and the power source. The output terminal of the CPU circuit is connected to the input terminal of the switching circuit. The input terminal of the operational amplifier circuit is connected to the output terminal of the switching circuit. The switching circuit and the sensor interface circuit are interconnected. The output terminals of the power source are connected to the input terminals of the switching circuit and the sensor interface circuit. The main body further comprises an alarming source which gives a warning signal when another vehicle approaches and a controlling circuit which controls the alarming source. The controlling circuit is connected to the output terminal of the CPU circuit and the power source. When the vehicle is parked, the present invention can automatically detect the distance of another approaching vehicle and gives a warning signal.

The said controlling circuit comprises a relay controlling circuit and a relay connector. The relay controlling circuit is connected to the output terminal of the CPU circuit and the power source.

The said alarming source is a luminous device or a sound making device or a combination of the two. The said luminous device is the direction indicators of the vehicle and the said sound making device is the horn of the vehicle.

The said sensors are disposed at the front and the rear of the vehicle. The number of the said sensors disposed at the front and the rear of the vehicle is preferably between 2 to 6 for both the front and the rear. Sensors can also be disposed at the left and the right sides of the vehicle so as to ensure that any vehicles approaching from the front, the rear, the left or the right of the vehicle can be detected.

The said detecting circuit comprises brake pedal detection, reverse gear detection and power on detection.

There is a display interface which is connected to the output terminal of the CPU circuit. The display interface is connected to the display.

There is an audio controlling terminal which is connected to the relay controlling circuit and the power source by means of the relay connector. If the vehicle is reversing and its audio is turned on, the present invention will automatically stop the operation of the audio when it detects a proximate obstacle. The alarm of the reverse radar can therefore be more audible and the safety of reversing the vehicle can be enhanced.

The structure of the present invention is simple. When the vehicle is parked in a car park and the driver is not present, the present invention can give a warning signal to alert the approaching vehicle so as to prevent accident.

A indicates the power source of the main body;
B indicates the relay connector of the main body;
C indicates the relay controlling circuit of the main body;
D indicates the CPU circuit of the main body;
E indicates the switching circuit of the main body;
F indicates the operational amplifier circuit of the main body;
G indicates the display interface of the main body;
H is the brake pedal, reverse gear detection and power on detection circuit of the main body;
I indicates the sensors;
J indicates the sensor interface circuit of the main body;
K indicates the direction indicators of the vehicle;
L indicates the horn of the vehicle;
M indicates the audio controlling terminal.

The present invention will be further illustrated with the diagrams and an exemplary embodiment.

DETAILED DESCRIPTION OF THE INVENTION

Figure 1:
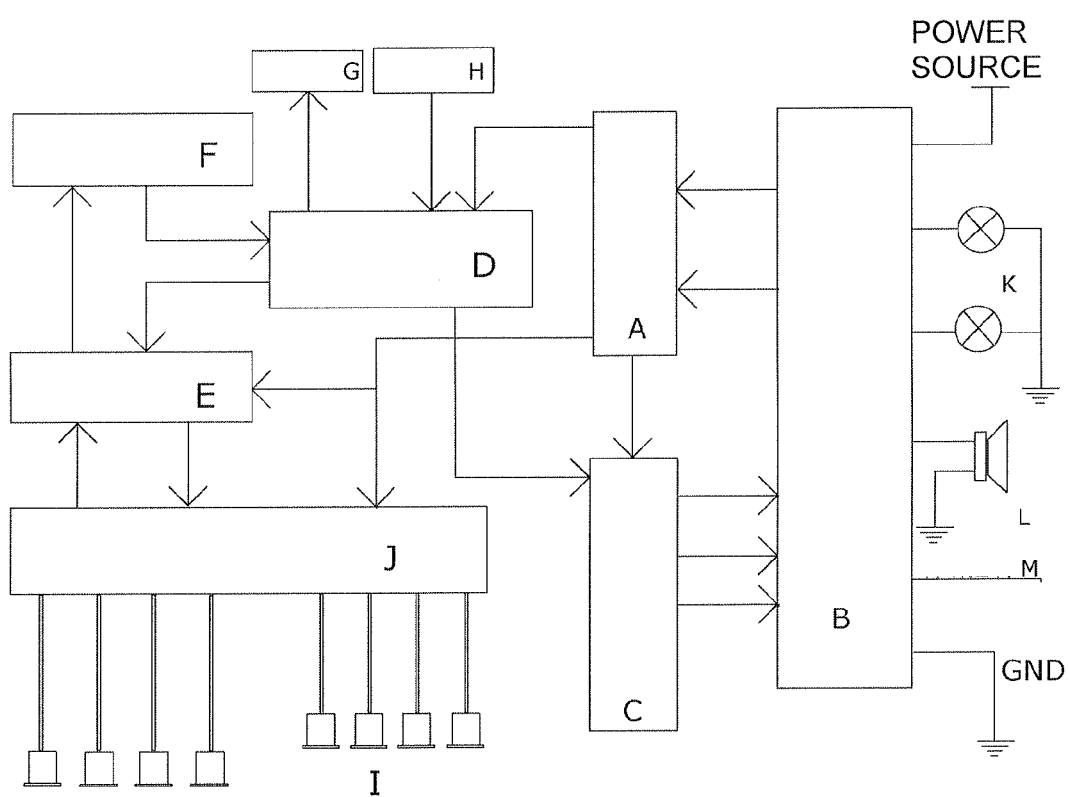
FIG. 1 is a schematic block diagram of the present invention.
Figure 2:
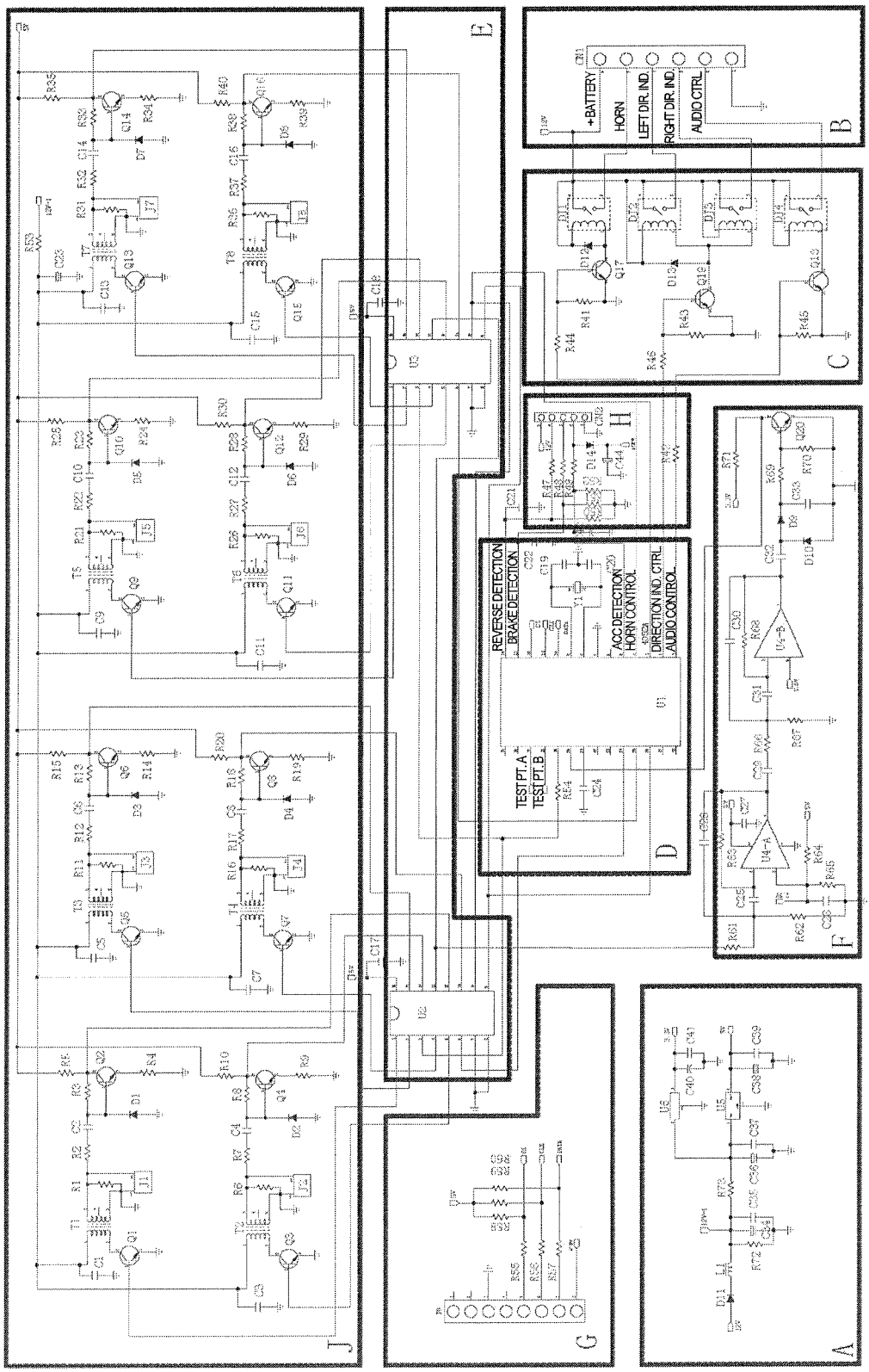
FIG. 2 is a circuit diagram of the present invention.

As illustrated in FIGS. 1 and 2, the present invention comprises a main body and sensors I. The main body comprises a CPU circuit D, an operational amplifier circuit F, a switching circuit E, a sensor interface circuit J, a display interface circuit G, a brake pedal, reverse gear and power on detection circuit H, a power source A, a relay controlling circuit C and a relay connector B. The input terminals of the CPU circuit D are connected to the output terminals of the operational amplifier circuit F, the power source A and the brake pedal, reverse gear and power on detection circuit H. The output terminals of the CPU circuit D are connected to the input terminals of the display interface a the switching circuit E and the relay controlling circuit C. The input terminal of the operational amplifier circuit F is connected to the output terminal of the switching circuit E. The switching circuit F and the sensor interface circuit J are interconnected. The output terminals of the power source A are connected to the input terminals of the switching circuit E, the sensor interface circuit J and the relay controlling circuit C. The direction indicators K of the vehicle, the horn L of the vehicle and the audio controlling terminal M are connected to the relay controlling circuit C and the power source A by means of the relay connector B. 4 sensors I are disposed at the front and the rear of the vehicle respectively.

The operation of the present invention is as follows. The operation of the reverse radar of the present invention is triggered by the voltages of positive pole of the brake lights, the positive pole of the reverse lights and the ACC detection signal. When the vehicle is braking, reversing or stopping, the triggering voltage is input to the CPU circuit of the main body and then converted into a signal that can be received by the micro controller unit in the CPU circuit. The micro controller unit commands the switching circuit to operate and sends a signal to the sensor interface circuit simultaneously. The signal is then boosted to be an ultrasonic signal of a higher current level to drive the ultrasound transmitting-receiving sensors. When the sensors receive the ultrasound reflected by an obstacle, the reflected signal undergoes frequency selection and amplification in the operational amplifier circuit and is then converted into a command signal that can be received by the micro controller unit. The CPU circuit then calculates the distance between the obstacle and the sensors according to the difference between the signal transmitting time and the signal receiving time. At the same time, the CPU circuit sends a corresponding signal to the display by means of the display interface circuit to change the display accordingly. The driver of the vehicle can then make a correct judgment on the movement of the vehicle.

Figure 3:
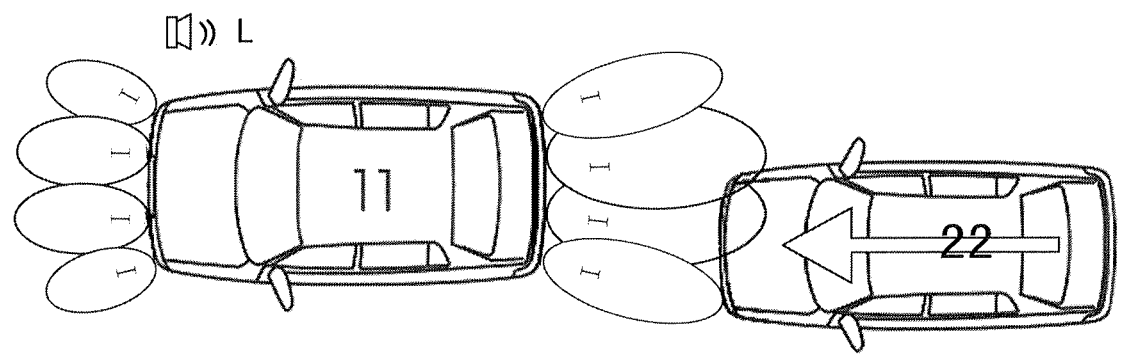
FIG. 3 is a schematic diagram which illustrates the operation of the present invention.

FIG. 3 illustrates a situation when the ACC has no power, the vehicle 11 does not move and the driver is not present. If another vehicle 22 approaches the vehicle 11 to a certain distance, the sensors at the front and the rear of the vehicle 11 send a signal to the CPU circuit. After receiving the signal, the CPU circuit flashes the direction indicators and sounds the horn by means of the relay controlling circuit to alert the approaching vehicle in order to prevent accident.

If the vehicle is reversing and its audio is turned on, the CPU circuit will automatically stop the operation of the audio by means of the relay controlling circuit and the audio controlling terminal when a proximate obstacle is detected. The alarm of the reverse radar can therefore be more audible and the safety of reversing the vehicle can be enhanced.

The foregoing is considered as illustrative only of one specific exemplary embodiment of the invention. It is not desired to limit the invention to the exact construction and operation as shown and described, and accordingly, all suitable modifications and equivalents may be resorted to failing within the scope of the invention.

What is claimed is:

1. A reverse radar with vehicle approaching alarm comprising a main body and sensors mounted on a vehicle, in which the main body comprises a CPU circuit, an operational amplifier circuit, a switching circuit, a sensor interface circuit connected to the sensors, a detecting circuit wherein the detecting circuit is a brake pedal, reverse gear and power on detecting circuit, and a power source, and the input terminals of the CPU circuit are connected to the output terminals of the operational amplifier circuit, the detecting circuit and the power source, and the output terminal of the CPU circuit is connected to the input terminal of the switching circuit, and the input terminal of the operational amplifier circuit is connected to the output terminal of the switching circuit, and the switching circuit and the sensor interface circuit are interconnected, and the output terminals of the power source are connected to the input terminals of the switching circuit and the sensor interface circuit, characterized in that the main body further comprises an alarming source which gives a warning signal when at least one sensor detects another vehicle approaches and a controlling circuit which controls the alarming source responsive to the at least one sensor, and the controlling circuit is connected to the output terminal of the CPU circuit and the power source.

2. The reverse radar according to claim 1, wherein the said controlling circuit comprises a relay controlling circuit and a relay connector, and the relay controlling circuit is connected to the output terminal of the CPU circuit and the power source.

3. The reverse radar according to claim 1 or 2, wherein the said alarming source is a luminous device or a sound making device or a combination of the two.

4. The reverse radar according to claim 3, wherein the said luminous device is the direction indicators of the vehicle and the said sound making device is the horn of the vehicle.

5. The reverse radar according to claim 1, wherein the said sensors are disposed at the front and the rear of the vehicle.

6. The reverse radar according to claim 5, wherein the number of the said sensors disposed at the front and the rear of the vehicle is between 2 to 6 for both the front and the rear.

7. The reverse radar according to claim 5, wherein the said sensors are disposed at the left and the right sides of the vehicle.

8. The reverse radar according to claim 1, wherein the said detecting circuit comprises brake pedal detection, reverse gear detection and power on detection.

9. The reverse radar according to claim 1, wherein there is a display interface which Is connected to the output terminal of the CPU circuit.

10. The reverse radar according to claim 2, wherein there is an audio controlling terminal which is connected to the relay controlling circuit and the power source by means of the relay connector.

* * * * *